United States Patent [19]

Pavey et al.

[11] 3,969,534

[45] July 13, 1976

[54] SHELF-STABLE LOW-FAT BIOLOGICALLY FERMENTED DAIRY PRODUCT

[75] Inventors: Robert L. Pavey, Western Springs; Patrick E. Mone, Oak Lawn, both of Ill.

[73] Assignee: Swift & Company, Chicago, Ill.

[22] Filed: June 10, 1974

[21] Appl. No.: 477,590

[52] U.S. Cl. .............................. 426/34; 426/43; 426/583; 426/409
[51] Int. Cl.² ........................................ A23C 9/12
[58] Field of Search .............. 426/34, 36, 42, 43, 426/167, 168, 185, 215, 350, 356, 573, 576, 661, 583

[56] References Cited
UNITED STATES PATENTS

| | | | |
|---|---|---|---|
| 1,719,760 | 7/1929 | Fisher | 426/130 |
| 3,084,052 | 4/1963 | McLaughlin | 426/393 X |
| 3,235,387 | 2/1966 | Stumbo et al. | 426/356 X |
| 3,269,842 | 8/1966 | Mayer et al. | 426/43 |
| 3,340,066 | 9/1967 | Corbin et al. | 426/356 |
| 3,539,363 | 11/1970 | Morgan et al. | 426/36 |

Primary Examiner—A. Louis Monacell
Assistant Examiner—R. A. Yoncoskie
Attorney, Agent, or Firm—Edward T. McCabe; Charles E. Bouton; Raymond M. Melcher

[57] ABSTRACT

Shelf-stable low-fat cultured dairy products, prepared through fermentation, have essentially natural characteristics in plain and flavored varieties, which characteristics are retained over an extended period of time, without refrigeration. A low-fat dairy culture composition is sterilized and cooled; a food starch is blended therein; the blended product then undergoes a syneresis step at a temperature within the approximate range of 100° to 150°F., which temperature is below the pasteurization temperature of such blended product and below the temperature at which the food starch will set; after the syneresis step, the product is homogenized; the homogenized product is adjusted, if necessary, to a pH of 4.5 or less, filled into containers and sealed therein; and the containerized product is pasteurized.

12 Claims, No Drawings

SHELF-STABLE LOW-FAT BIOLOGICALLY FERMENTED DAIRY PRODUCT

The present invention relates to cultured dairy products of low-fat content. The product of this invention displays essentially all the characteristics of freshly prepared and marketed dairy products that are stored under refrigeration. More specifically, the present invention is an improved shelf-stable, low-fat cultured dairy product and a process for the manufacture thereof.

Dairy products of the fermented type include yoghurt, buttermilk, dairy dips and dairy spreads, yoghurt having a light, smooth body with a slight gel, buttermilk having a slightly heavier viscosity, and dips and spreads having a much heavier body.

Dairy products of the fermented type are customarily marketed at a fresh dairy product that must be stored under refrigeration and even then exhibits a very short shelf life, primarily due to biological contamination and syneresis or "wheying off." This separation of the dairy product into curd and whey, believed to be due to denaturation and dehydration of the dairy protein, becomes evident about 5 days after such low-fat fresh dairy products are prepared and kept refrigerated. Traditionally, fermented-type low-fat dairy products are bacterially produced by introducing cultures of bacteria that develop the desired properties of these types of products.

It is believed that bacterial cultures accomplish the transformation of milk products into fermented milk products under incubation conditions where the growth of bacteria in the culture produces an edible acid. When sufficient acid has been formed through this bacterial growth process to lower the pH to about 5.0, the casein in the product begins to flocculate and form a gel. Under this traditional process, bacterial growth and acid development are suspended after a desired texture and pH are obtained.

It has been proposed that a longer shelf life can be obtained by replacing the bacterial fermentation with a chemical treatment. For example, Corbin, et al., U.S. Pat. No. 3,340,066 teaches that buttermilk having a shelf life of up to 1 month, under refrigeration, can be obtained by acidifying a stabilized milk in lieu of introducing a bacterial culture to achieve the desired fermentation. Eliminating the introduction of a bacterial culture avoids the traditional problem of controlling the bacterial fermentation process.

Edwards U.S. Pat. No. 3,432,306 also teaches a process for preparing chemically acidified milk products. Edwards points out various disadvantages in prior art bacterially developed milk products. These disadvantages include the difficulty of controlling the bacterial culture and of protecting the culture from bacteriological contamination. Edwards also mentions that complicated equipment and elaborate handling procedures are needed under prior art teachings that attempt to minimize such disadvantages of known bacterial methods. Also present as a problem in prior art culturally produced dairy products is that it is difficult to obtain a final product that is consistent in body, flavor, texture, smoothness and appearance. Edwards indicates that these difficulties of prior art bacterially developed milk products are to be eliminated by replacing bacterial fermentation with an acidification process. However, it has been found that such difficulties can be eliminated while retaining the advantages of a natural fermentation.

It is therefore an object of the present invention to provide a biologically fermented dairy product having a room temperature shelf life of at least 6 months.

A further object of the instant invention is to provide a biologically fermented dairy product that is protected from bacterial contamination and does not exhibit appreciable wheying off even after unrefrigerated storage for several months.

Another object of the present invention is to provide a product that is capable of being handled through conventional containerization means without need for complicated equipment and elaborate handling procedures.

Additionally, it is an object of the present invention to prepare a bacteriologically fermented dairy product through a method that allows natural fermentation by a culture medium to produce products having essentially natural characteristics in body, texture, flavor and color, which characteristics are retained over extended periods, without refrigeration.

It is likewise an object of the instant invention to utilize a method to produce a bacteriologically fermented dairy product during which the product being prepared remains readily flowable until after it is aseptically packaged.

One other object of the present invention is to produce a final bacteriologically fermented dairy product, flavored or unflavored, that is consistent in its body, texture, flavor, smoothness and appearance.

The biologically fermented dairy products of the present invention possess all of the essential natural characteristics of body, texture, flavor and color exhibited by biologically fermented dairy products as they are prepared by prior art natural fermentation processes, yet are susceptible of being containerized without curd and whey separation, at the same time exhibiting a non-refrigerated shelf life of at least 6 months before the development of either appreciable syneresis or bacterial contamination. Such shelf-stable cultured dairy or low-fat dairy products include yoghurt, buttermilk, dairy dips, and dairy spreads.

In the process of the present invention, a pasteurized, low-fat dairy base is biologically fermented, to which is added a stabilizer. Next a syneresis step is accomplished by heating at a temperature high enough to promote "wheying off," but low enough to be below the pasteurization temperature of the particular dairy product. An homogenization step follows. This combination of a syneresis step followed by an homogenization step prevents wheying off in the final product. The product is then pasteurized.

Additional objects, if not specifically set forth herein, will be readily apparent to those skilled in the art from the following detailed description.

The low-fat dairy base of the present invention contains a butterfat level of from 0 to 5% by weight. The dairy base can be prepared from reconstituted non-fat milk solids plus water, or non-fat milk solids plus water and cream (having about a 36% butterfat content), or whole milk (containing about 3.5% butterfat content) or whole milk plus cream.

The culture utilized to naturally ferment the dairy base is one that is commercially available and suitable for the type of non-fat dairy product to be formed. For example, one especially suitable for formation of a yoghurt-type product is a culture of concentrated selected strains of lactic acid producing dairy bacteria, wherein the active organisms are *Lactobacillus bulgaricus* and *Streptococcus thermophilus*. The amount of culture utilized is on the order of 1 ml of culture per 10 to 35 pounds of completed product.

The stabilizer can be an edible starch in the amount of about 0.1 to 3.0% by weight of the dairy base being produced. The starch must be edible and suitable for use at a low pH. Found to be especially suitable are starches that are modified waxy maizes that are smooth, nongelling and of bland flavor. A preferred starch has a pH of about 5.8, a midpoint gelatinization temperature of about 155°F., and a moisture content of about 10%. Also suitable are food starches refined from tapioca. One such starch has a pH of about 6.0 and a moisture content of about 13%. The starches should be resistant to relatively high temperatures and acid conditions. If too great a quantity of starch is utilized, the final product will exhibit an excessively heavy body. Also, such a product would tend to leave residual material in one's mouth after it is eaten.

In addition to the starch stabilizer, a gelatin stabilizer may optionally also be included in the dairy base in the approximate range of from 0 to about 1.5% by weight of the dairy base being produced. Should the amount of gelatin be too high, the final product will exhibit an undesirable consistency. For example, in the case of yoghurt, a product having too great a gelatin content will exhibit excessive shine and a set that is too rigid. A gelatin has large, randomly coiled molecules of about 18 different amino acids joined together by amide linkages in long molecular chains. A gelatin found to be particularly satisfactory is one that has a Bloom index of 275.

If the product is flavored, it can contain from about 5 to 25% by weight of one or more of a flavoring base, a fruit, a fruit base, a sweetener, a coloring agent, or any other food component as desired and recognized as conventionally compatible with such product. Such flavoring elements include, singly or in combination, chives, bacon, onion, blue cheese, pineapple, strawberry, apple, lime, plum, blackberry, peach, black cherry, red raspberry, cherry, prune, lemon, blueberry, coconut, chocolate and sugars, or extracts of any of these.

The low-fat dairy product of this invention is of the type that is produced by natural, biological fermentation. The final product has substantially the characteristics of a cultured low-fat dairy product that is freshly produced and distributed under refrigeration. Body, color, flavor and texture characteristics of the present product are very similar to those of the freshly produced, refrigeration-distributed product. The product of the present invention has exceptional consistency of such physical attributes as body, texture, flavor and appearance. The instant product has a butterfat content of not greater than about 0.5% by weight, an edible starch stabilizer content of from about 0.1 to 3.0% by weight, an optional additional stabilizer of gelatin from 0 to about 1.5% by weight, optional additionally added flavoring agents of from 0 to about 25% by weight, a final pH of 4.5 or lower, and is packaged in hermetically sealed containers.

In the method of the present invention, the low-fat (about 0 to 5% butterfat content) milk base, in a liquid state, is mixed through a conventional homogenizer, while being careful to insure that the temperature of the milk base at no time exceeds 185°F. The homogenized base is pasteurized, with mixing, in a conventional manner, the pasteurization being sufficient to remove all bacteria that would interfere with the subsequent culture development. A pasteurization temperature of about 180°–185°F. for approximately 30 minutes should be adequate for this purpose.

The milk base is cooled to the incubation temperature appropriate for the type of product being prepared and the culture being used. For example, when yoghurt is prepared with a conventional yoghurt culture, the innoculation temperature is about 108°–110°F. A culture is added to the cooled milk base and incubated at the incubation temperature until an acid level of approximately 0.85% is attained. This acid level should be reached during an incubation time of roughly 4 hours.

After the incubation period, a starch stabilizer in the approximate amount of 0.1–3.0% by weight of the total cultured milk base and stabilizer composition is added. Although not an essential feature of this invention, the starch can be added as a fluid slurry to achieve more uniform distribution of the starch and thus a more uniform end product. Such a slurry would contain roughly 1½ parts by weight of water or whole milk for each part by weight of starch.

Gelatin may be added as an additional stabilizer in the approximate amount of 0 to 1.5% by weight of the total cultured milk base and stabilizer composition. As in the case of the starch, the gelatin may also be added in fluid form to enhance the uniformity of the product, and would be added as a gelatin solution containing roughly 1½ parts by weight of water or whole milk for each 0.3 part by weight of gelatin.

The cultured milk base and stabilizer or stabilizers are mixed for a short period of time on the order of 5 minutes to achieve a relatively uniform consistency.

The mixture is then heated to a temperature range of approximately 100°–150°F. It is a critical feature of the present invention that the temperature be low enough to avoid setting of the starch and pasteurization of the product at this time, while at the same time being high enough to achieve syneresis, or separation of curd and whey. The exact temperature will depend upon the type of product being prepared and the particular starch utilized. For example, when preparing a yoghurt base including a modified waxy maize starch, the preferred syneresis temperature is about 125°F.

After the syneresis step, the cultured milk base and stabilizer mixture is homogenized through a conventional homogenizer, the mixture being kept at a temperature approximating the syneresis temperature. The homogenizer should be run within the range of 500–2000 psi, an especially acceptable setting getting about 1000 psi. During this homogenization step, the product having "wheyed off" through the syneresis step, is restructured to a smooth consistency. Since the syneresis step is carried out at a temperature sufficient to cause extensive coagulation or curd and whey separation and the thus coagulated product is then restructured by homogenization, coagulation or curd and whey separation will not recur during the subsequent pasteurization of the final containerized product.

Should it be desired to have a flavored end product, suitable flavoring agents, including flavoring bases, fruits, fruit bases, sweeteners and coloring agents, may be added in the approximate amount of 5–25% by weight of the final product, with mixing for about 3 to 10 minutes.

The acidity of the product is then determined. If the pH is found to be greater than about 4.5, then a weak acid such as citric acid or malic acid is added. The amount of acid, if any, needed to adequately lower the pH will vary with the product being made, particularly because most of the flavorings that might have been added would themselves be acidic. Should the pH be found to be too high at this stage, the addition of about 0.05–1.0% by weight of, say, citric acid should adjust the pH to 4.5 or lower.

At this point in the process, since the starch has not yet been set, the product is flowable and still pumpable through conventional container filling apparatus to hermetically package the product with such apparatus. A variety of conventional packaging apparatus and methods can be employed. Among the possible packaging alternatives, two will be described.

One type of packaging is accomplished with the flowable product being containerized at room temperature, and thereafter subjected to a final pasteurization step. With this apparatus, the flowable product is pumped into a vacuum chamber to deaerate the product at about 21 to 29 inches of mercury. Non-sterile containers are filled with the flowable product and vacuum sealed. The product is then heated to effect pasteurization. Acceptable pasteurization conditions are on the order of 170°–200°F. (preferably 180°–185°F.) for at least 30 minutes. The product is then cooled to below 80°F. This product is then suitable for shelf storage, without refrigeration, and will exhibit a shelf life of at least 6 months.

Another type of packaging is accomplished by a hot pack filling apparatus. The flowable product is reheated to about 170°–200°F. (preferably 180°–185°F.). These temperatures are sufficient to accomplish pasteurization and setting of the starch once the product enters the container and is allowed to stand at the elevated temperature. The flowable product enters presterilized containers hot and the containers are sealed without pulling a vacuum. The containers are inverted and allowed to stand for greater than 5 minutes, thereafter the containers being cooled to below 80°F. The final product is one that is hermetically containerized, pasteurized and set within the container, and has an unrefrigerated shelf life of at least 6 months.

The following examples are presented to illustrate the invention. It will be understood that the specific embodiments and illustrations should not be taken in any manner as limiting the invention as defined in the appended claims.

EXAMPLE I

A yoghurt base was first prepared. The following percentages are by weight and are based upon the total composition of the yoghurt base. Water (77.9%) was placed in a steamheated, water-jacketed vat equipped with baffles and a variable speed agitator. With continuous mechanical mixing, 12.3% non-fat milk solids were added to the water and mixed until the non-fat milk solids were completely dissolved to form a liquid skim milk. It was necessary to allow sufficient headspace in the vat for foam developed while reconstituting the non-fat milk solids. With continuous mixing of this skim milk, 3.0% cream (containing 36% butterfat) was added. The water in the jacket was heated until the temperature of the skim milk-cream mix reached between about 130°–150°F. The mix was pumped from the mixer through a homogenizer set for single stage at 1000 psi and then pumped back into the vat until the entire volume had been homogenized. During this homogenization process, the product temperature was kept at 185°F. or lower. The homogenization time was approximately 30 minutes. The temperature of the product was maintained at approximately 180°–185°F. for 30 minutes so as to accomplish sufficient pasteurization to remove all bacteria. During the pasteurization, the vat was kept covered. The pasteurized mix was then lowered to a temperature of about 108°F. During this cooling process, slow mixing was maintained and the vat was kept covered. The mixing speed was then increased, and one ml. of yoghurt culture per 11 pounds of yoghurt product was slowly added and thoroughly distributed throughout the mix. The active organisms in the culture were *Lactobacillus bulgaricus* and *Streptococcus thermophilus*. After the culture was added, mixing was discontinued, and the covered product was incubated at 108°–110°F. After about 4 hours an acidity test was run, the acidity being 0.85%.

A slurry of 3.0% water and 2.0% modified waxy maize starch was prepared. Also prepared was a solution of 1.5% water and 0.3% gelatin. The incubated mix was uncovered and mechanically mixed at slow speed, while adding the starch slurry and the gelatin solution. Uniform distribution of the total mix was accomplished after a mixing time of approximately 5 minutes. During this mixing, heating to effect a temperature rise was begun. The mix was heated to approximately 125°F., until appreciable syneresis was observed. After syneresis, the yoghurt base was pumped through the homogenizer set for single stage at 1000 psi. The yoghurt base thus prepared had a calculated butterfat level of 1.17%.

A plain yoghurt product was then prepared, utilizing the yoghurt base just prepared. The following percentages expressed in this example are by weight based on the total composition of the final yoghurt product. A quantity of 93.55% of the yoghurt base was mixed for about 5 minutes in a mixing vat wth 6.25% sucrose and 0.20% citric acid to form a flowable plain yoghurt dairy mixture.

The mixture was pumped from the mixing vat into a vacuum chamber to deaerate in excess of 21 inches of mercury. The deaerated mixture was pumped to a conventional automatic filling machine. Six ounce, 208 × 208 containers were filled under a minimum vacuum of 15 inches of mercury, the residual vacuum in each container being about 10 inches of mercury. The thus sealed cans were processed in a water bath of about 180°F. for at least 35 minutes. The heating time was sufficient to effect setting of the starch and pasteurization of each of the plain yoghurt products. The containers were cooled to at least 80°F. to complete setting to accomplish the desired consistency of the yoghurt. The final containerized product was stored at room temperature and exhibited acceptable stability 6 months later.

EXAMPLE II

A yoghurt product was prepared under the same conditions aand with the same apparatus as those of Example I, except the composition of the initial dairy base was 80.9% water and 12.3% non-fat milk solids, these percentages being expressed by weight of total yoghurt base initially prepared. The yoghurt base of this example had a butterfat level calculated at 0.2% by weight.

EXAMPLE III

An initial dairy base, starch slurry, and gelatin solution different from those of Example I were used to prepare a yoghurt product by the process and with the apparatus of Example I. The percentages are by weight and are based upon the initially prepared total yoghurt base composition. The dairy base consisted of 92.2% whole milk (3.5% butterfat content) and 1.0% cream (36% butterfat content). The initial step of the process of Example I was modified in that the dissolving step was unnecessary since the initial ingredients were in a liquid form. The starch slurry was composed of 3.0% whole milk and 2.0% modified waxy maize starch. The gelatin solution contained 1.5% whole milk and 0.3% gelatin. The calculated butterfat level of the yoghurt base prepared was 3.87%.

EXAMPLE IV

A yoghurt product made from a base containing 3.50 calculated butterfat level was prepared essentially as in Example III, except that the only ingredient in the initial dairy base was 93.2% whole milk.

EXAMPLE V

The four flowable plain yoghurt dairy products prepared in accordance with Examples I, II, III and IV were containerized by utilizing a hot pack fill procedure in lieu of the vacuum packaging of Examples I, II, III and IV. Each flowable plain yohurt mixture was pumped from the mixing vat through a heat exchanger to elevate the temperature of each of the four mixtures to about 180°-185°F. Each mixture was continuously pumped through the heat exchanger to an automatic filling machine of conventional construction. Six ounce, 208 × 208 pre-sterilized containers were filled with the hot mixture and sealed without vacuum. Each hot sealed container was inverted and allowed to stand for at least 5 minutes. The containerized plain yoghurt product was cooled in cold water for at least 30 minutes, until the internal product temperature was below 80°F. The final products were kept at room temperature for several months and exhibited acceptable stability.

EXAMPLE VI

Four different strawberry yoghurt products were prepared, starting with each of the four yoghurt bases prepared in Examples I, II, III, and IV. The percentages expressed in this example are by weight based on the total composition of the final yoghurt product. A quantity of 80.8% of each of the yoghurt bases prepared in Example I, II, III and IV was blended for approximately 5 minutes with 15% strawberry fruit base, 4.0% sucrose and 0.2% citric acid to form a flowable strawberry yoghurt dairy mixture. Each of these four strawberry yoghurt dairy mixtures were pumped, containerized as in Example I, and stored at room temperature for several months, with no appreciable deterioration of the strawberry yoghurts.

EXAMPLE VII

The four different flowable strawberry yoghurt dairy mixtures prepared in Example VI were pumped, containerized in accordance with Example V, and stored. Each of the products exhibited shelf stability at room temperature for several months.

EXAMPLE VIII

A pineapple flavored yoghurt was prepared with starch and gelatin being added in dry form. A low-fat milk base was prepared by mixing 615 grams non-fat milk solids, 125 grams cream (36% butterfat content) and 4,260 grams water. The butterfat content of this formulation was 1.02% by weight. This product was homogenized and pasteurized at about 180°F. The mixture was then chilled to about 110°F. The mixture was inoculated by adding one ml. of yoghurt culture, the mixture being kept covered during inoculation, which continued for 4 hours and 10 minutes when an acidity level of about 0.85% was reached. 100 grams of an edible modified waxy maize starch and 15 grams of gelatin were added with agitation, and heated in a water bath of 148°F. This mixture was then homogenized at 1000 psi to form a flowable yoghurt base. 808 grams of this yoghurt base was mixed with 150 grams of a pineapple base, 40 grams sugar and 0.75% grams citric acid. The mixture was containerized in accordance with the procedure followed in Example I. The prepared pineapple yoghurt had good appearance and flavor. The consistency of this product was found to be acceptable, but slightly less acceptable than the flavored yoghurts prepared with fluidized stabilizers.

EXAMPLE IX

A yoghurt product containing no gelatin was prepared in this example, in which percentages are by weight and are based upon the total composition. Non-fat milk solids (12.3%) were blended in a mechanical stirrer with 85.7% water. This mixture was heated to 190°F. and held at this temperature to pasteurize the skim milk thus prepared. After cooling to 110°F, 1 ml. of conventional yoghurt culture was added, with agitation. The mixture was covered and allowed to incubate at 110°F. for about 4 hours and 20 minutes, at which time the acidity was about 1.0%. Thereafter, the incubated product was stirred and 2.0% of a modified waxy maize starch was added. Then, the product was heated until curd formation, the temperature near the side of the container being within the range of 135°-150°F., the temperature in the center of the container within the range of 1150°-127°F. After this step, the product was homogenized through a single stage process at 1000 psi. The product was both containerized and finally pasteurized. The consistency of the final yoghurt product was relatively thin, but still acceptable.

EXAMPLE X

A yoghurt product was prepared in accordance with the procedures of Example I, except that he yoghurt product prepared was of a high protein type. The initially prepared base contained 1115 grams (22.3%) of non-fat milk solids and 3,885 grams (77.7%) of water. Both starch and gelatin stabilizers were added, 100 grams of a waxy maize starch and 15 grams of gelatin. The flavor of the final yoghurt product was good, the consistency was relatively heavy, and the color of the final product was slightly darker than other yoghurt products prepared in accordance with this invention which were not of the high protein type.

EXAMPLE XI

A low-fat sour cream dip was prepared in this example. 240 grams (12.0%) non-fat milk solids and 1717 grams (85.85%) water were blended together, and pasteurized. Incubation was then accomplished by adding a lactic sour cream culture at a 2% level, maintaining the temperature at 70°F., and allowing to stand overnight. 40 grams (2.0%) of an edible, modified tapioca starch stabilizer was added. Blending was accomplished and the temperature raised until curd and whey separation was readily apparent, at a temperature above 130°F. A homogenization treatment was then accomplished through a single stage process at 1000 psi. The thus treated products were sealed in 401 × 105 aluminum cans under 14 to 15 inches of mercury vacuum. The sealed containers were heated in a water bath at 180°F. for 30 minutes. The products were then cooled at room temperature.

We claim:

1. A process for producing a shelf-stable cultured low-fat dairy product comprising: a first pasteurization step by heating a low-fat dairy base; biologically fermenting said dairy base; mixing in a starch stabilizer; heating the mixture to a syneresis temperature high enough to promote syneresis and low enough to avoid both pasteurization and setting of the mixture; maintaining the syneresis temperature until appreciable syneresis is accomplished, said syneresis temperature being within the approximate range of 100° to 150°F.; thereafter homogenizing the mixture to restructure same into a uniform, flowable, preset product; flowing the preset product in preparation for a canning step; accomplishing a second pasteurization step at a temperature of approximately 170° to 200°F., said secnd pasteurization step also serving to initiate setting of the present product; and permitting final setting of the flowable present product in a container to produce a cultured low-fat dairy product that has a room temperature shelf stability of at least 6 months.

2. The process of claim 1, wherein the homogenization step is carried out at approximately the temperature of the syneresis step and at about 500 to 2000 psi until the syneresis step is essentially reversed.

3. The process of claim 1, further including the step of blending in from about 5 to 25 weight percent of a flavoring agent after the homogenization step.

4. The process of claim 1, wherein the low-fat dairy base has a butterfat content of not greater than 5.0 weight percent.

5. The process of claim 1, wherein the second pasteurization step is at about 180°–185°F. for approximately 30 minutes.

6. The process of claim 1, wherein the starch stabilizer is edible and is from about 0.1 to about 3.0 weight percent of said mixture.

7. The process of claim 1, wherein an additional stabilizer is mixed into the biologically fermented dairy base, said additional stabilizer being a maximum of about 1.5% by weight of gelatin.

8. The process of cliam 6, wherein the edible starch is mixed in as a fluid slurry containing approximately 1½ parts by weight of fluid for each one part by weight of edible starch.

9. The process of claim 7, wherein the gelatin is mixed in as a fluid containing approximately 1½ parts by weight of fluid for each 0.3 parts by weight of gelatin.

10. The process of claim 1, wherein the pH of the preset product is reduced to 4.5 or lower by adding about 0.05 to 1.0% by weight of an edible weak acid.

11. The process of claim 1 wherein said flowing step flows the preset product into the container at ambient temperature and under vacuum, then vacuum sealing said container; said second pasteurization step takes place after said vacuum sealing and for at least about 30 minutes; and cooling the containerized product to below at least about 80°F. to complete the setting of the containerized product for shelf storage at ambient temperature.

12. The process of claim 1, wherein said second pasteurization step is carried out while flowing the preset product into the container, hermetically sealing said container, inverting the sealed container and permitting it to stand for at least about five minutes, cooling said container to below at least about 80°F., and storing the containerized product at ambient temperature.

* * * * *